United States Patent
Braun

(10) Patent No.: US 9,901,951 B2
(45) Date of Patent: Feb. 27, 2018

(54) DIP COATING SYSTEM COMPRISING A DEVICE FOR ROTATING THE ARTICLE TO BE TREATED

(71) Applicant: EISENMANN SE, Boeblingen (DE)

(72) Inventor: Juergen Braun, Neustetten (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 15/118,618

(22) PCT Filed: Feb. 3, 2015

(86) PCT No.: PCT/EP2015/000197
§ 371 (c)(1),
(2) Date: Aug. 12, 2016

(87) PCT Pub. No.: WO2015/120962
PCT Pub. Date: Aug. 20, 2015

(65) Prior Publication Data
US 2017/0050207 A1    Feb. 23, 2017

(30) Foreign Application Priority Data
Feb. 14, 2014   (DE) .................. 10 2014 001 878

(51) Int. Cl.
*B05C 3/10*   (2006.01)
*B65G 49/04*  (2006.01)
(Continued)

(52) U.S. Cl.
CPC ............... *B05C 3/10* (2013.01); *B05C 13/00* (2013.01); *B65G 49/02* (2013.01);
(Continued)

(58) Field of Classification Search
CPC ........... B05C 3/10; B05C 13/00; B05C 13/02; B65G 49/02; B65G 9/04; B65G 49/0463; B65G 2201/0294
(Continued)

(56) References Cited

U.S. PATENT DOCUMENTS

| | | |
|---|---|---|
| 3,200,052 A | 4/1961 | Huffman et al. |
| 3,585,734 A | 7/1966 | Barton et al. |

(Continued)

FOREIGN PATENT DOCUMENTS

| | | |
|---|---|---|
| DE | 196 41 048 A1 | 10/1998 |
| DE | 10 2004 024 614 A1 | 12/2005 |

*Primary Examiner* — Laura Edwards

(57) ABSTRACT

A dip coating system having at least one dip-coating tank, which can be filled with a treatment fluid. A conveying system displaces the articles to the dip-coating tank, into the interior of the dip-coating tank, out of the dip-coating tank, and away therefrom. This conveying system has at least one trolley which has a fastening device for the article, which can be rotated around an axis of rotation. The trolley is drawn by at least one driven traction chain extending parallel to its movement direction. A rotating device having at least one sprocket or gear wheel that can be connected to the fastening device in a rotation-locking manner, that is arranged coaxial to the rotational axis of the fastening device, and at least one rotation chain or rotation gear rack, which extends parallel to the movement direction of the trolley, with which the sprocket or gear wheel cams.

7 Claims, 6 Drawing Sheets

(51) Int. Cl.
  *B05C 13/00* (2006.01)
  *B65G 49/02* (2006.01)
  *B05C 13/02* (2006.01)
(52) U.S. Cl.
  CPC .......... *B65G 49/0463* (2013.01); *B05C 13/02* (2013.01); *B65G 2201/0294* (2013.01)
(58) Field of Classification Search
  USPC ..... 198/466.1, 406, 680, 681, 817; 118/409, 118/416, 423
  See application file for complete search history.

(56) References Cited

U.S. PATENT DOCUMENTS

| | | | |
|---|---|---|---|
| 6,419,983 | B1 | 7/2002 | Kreuzer |
| 7,081,164 | B2 * | 7/2006 | Kyotani ............. B65G 49/0463 118/423 |
| 2002/0162504 | A1 | 11/2002 | Kreuzer |
| 2008/0247847 | A1 | 10/2008 | Muller et al. |

* cited by examiner

DIP COATING SYSTEM COMPRISING A DEVICE FOR ROTATING THE ARTICLE TO BE TREATED

RELATED APPLICATIONS

This application is a national phase of International Patent Application No. PCT/EP2015/000197, filed Feb. 3, 2015, which claims the filing benefit of German Patent Application No. 10 2014 001 878.4, filed Feb. 14, 2014, the contents of both of which are incorporated herein by reference.

FIELD OF THE INVENTION

The invention relates to a dip coating system comprising
a) at least one dip coating tank which can be filled with a treatment fluid, in particular with fluid paint, into which the articles to be treated, in particular vehicle bodies can be dipped;
b) a conveyor system which can displace the articles to be treated to the dip coating tank, into the interior of the dip coating tank, out of the dip coating tank and away therefrom and comprises:
  ba) at least one trolley which has a fastening device which can be rotated around an axis of rotation, to which fastening device at least one article can be fastened;
  bb) a rotating device with which the fastening device can be rotated in certain sections of the movement path of the trolley;
  bc) at least one driven traction chain extending parallel to the movement path of the trolley.

BACKGROUND OF THE INVENTION

A dip coating system of this type is described in DE 106 41 048 C2. The rotating device here comprises on each trolley, referred to as "chassis" there, proportionally long arms or levers leading radially outwards from the axis of rotation, which cooperate in the corresponding sections of the movement path of the trolleys with stationary guide mechanisms. This rotating device is mechanically very complex, requires precise adjustment and is only slightly flexible.

SUMMARY OF THE INVENTION

An object of the invention is to design a dip coating system of the type mentioned in the introduction such that the rotation, to which the fastening devices must be subjected, can reliably take place in a mechanically simple and optionally easy to control manner.

This object may be achieved according to the invention in that
c) the rotating device comprises:
  ca) at least one sprocket or gear wheel that can be connected to the fastening device in a rotation-locking manner which is arranged coaxial to the axis of rotation of the fastening device;
  cb) at least one rotation chain or rotation gear rack which extends parallel to the movement direction of the trolley with which the sprocket or gear wheel cams.

The rotating device used according to the invention is constructed from very simple components, which can also reliably transfer larger forces without leading to mechanical deformations and thus maladjustments. The sections along the movement path of the trolleys, at which a rotation of the fastening device should take place, can be selected without problems and optionally also subsequently changed again.

In a preferred embodiment of the invention, the rotation chain or the rotation gear rack extends in the movement direction of the trolley over a section, in which a rotation movement should take place, wherein an adjustable coupling is provided, which in a first rotation direction does not establish a rotation connection between sprocket or gear wheel and fastening device in a first position and establishes a rotation connection between sprocket or gear wheel and fastening device in a second position. In the case of this embodiment of the invention, the rotation chain or the rotation gear rack can extend over a large distance along the movement path of the trolley, for example over the entire system length or also over the entire length of individual dip coating tanks. So long as the coupling is not engaged, the sprocket or gear wheel rotates. In the absence of a rotation connection to the fastening device, the latter and thus the article to be treated do not, however, rotate. Only in the regions, in which the coupling is actually engaged does a rotation movement take place. By selecting the points along the movement path, in which the coupling is engaged or disengaged, the position of the rotation movement can be determined in the simplest manner and optionally subsequently also changed again.

The coupling can advantageously also have a third position, in which a rotation connection is established between the sprocket or gear wheel and the fastening device in a second rotation direction opposed to the first rotation direction. This means, in particular that the process of rotating the article to be treated into and out of the treatment fluid can optionally take place in different rotation directions.

It is expedient if the coupling is actuatable via a coupling rod which cooperates with at least one guide mechanism, which is arranged stationary at a section of the movement path of the trolley in which a rotation takes place. The initiation of the rotation movement thus takes place completely mechanically. The location at which it occurs is exclusively determined by the location at which the guide mechanism is provided. This can also be easily changed as required.

In this regard, it may be useful if the guide mechanism can be displaced from a position in which it cooperates with the coupling rod into a position in which it does not cooperate with the coupling rod. In this way, it can be determined whether or not a rotation actually takes place at a point at which a guide mechanism is provided. For example, individual baths can thus be passed over or empty trolleys can be conveyed further without rotation.

The same advantage results in the case of the embodiment of the invention, whereby the coupling rod can be displaced from a position in which it cooperates with the guide mechanism, into a position in which it does not cooperate with the guide mechanism.

In the case of another, also advantageous embodiment of the invention, the rotation chain or the rotation gear rack is provided only in such sections of the movement path of the trolley, at which a rotation should take place. The sprocket or gear wheel and thus the article to be treated does not rotate between the sections of the movement path in question in the absence of the rotation chain or rotation gear rack. A particular coupling or other control measures are not required.

The embodiment of the invention, whereby the rotation chain is displaceable in the longitudinal direction, is particularly variable. The rotation speed of the rotating device then depends on the difference between the speeds of the traction chain, on the one hand, and the rotation chain, on the other hand. By changing the difference of these speeds, the rotation speed can thus be easily changed, wherein a reversal of the rotation direction is also possible without corresponding coupling.

Alternatively, the rotation chain or the rotation gear rack can also be immovable in the longitudinal direction. The rotation speed of the fastening device and of the article fastened thereto substantially results exclusively from the movement speed of the traction chain, provided a transmitting or reduction gearbox is not provided between the sprocket or gear wheel and the fastening device.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in greater detail below by means of the drawing; they show FIG. 1 perspectively shows a section from a dip coating system without articles to be painted.

DETAILED DESCRIPTION OF THE PRESENT INVENTION

Figure 1:
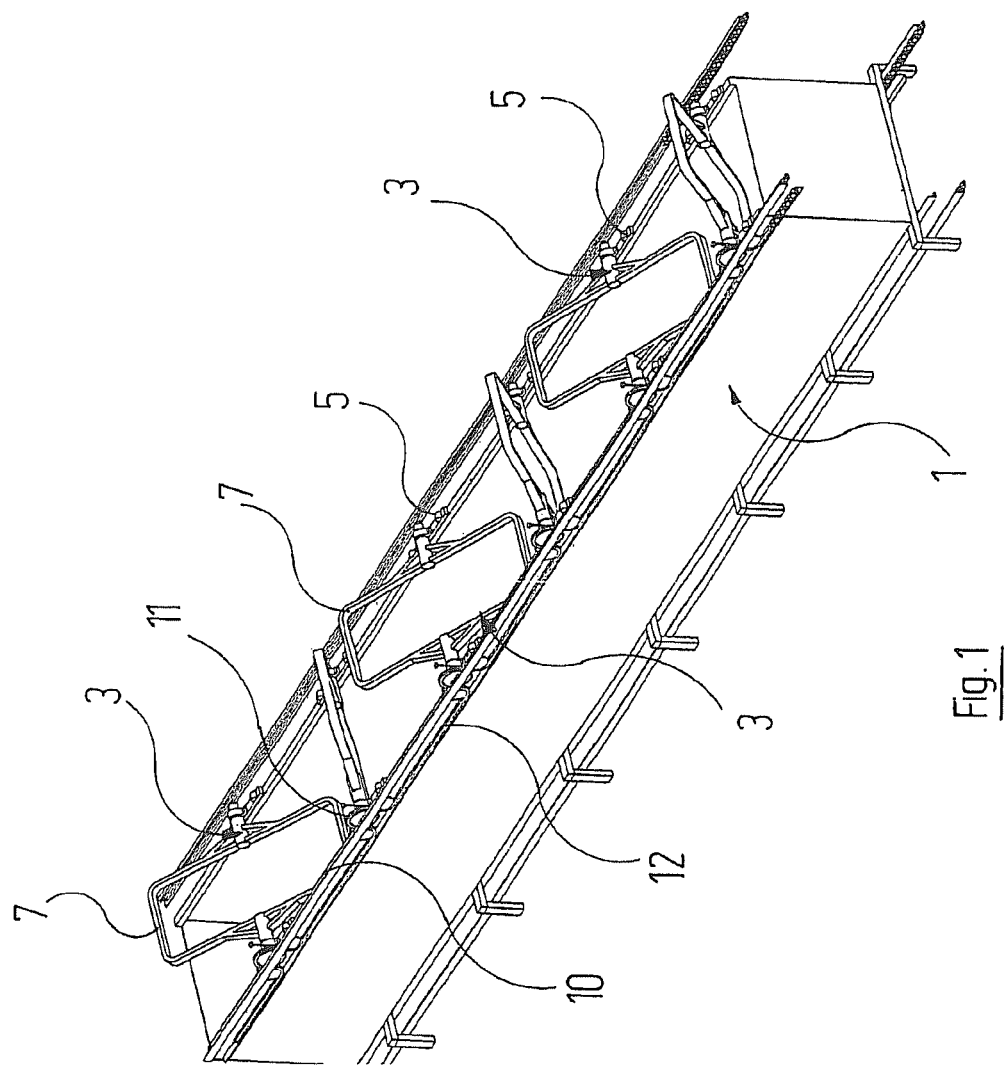

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
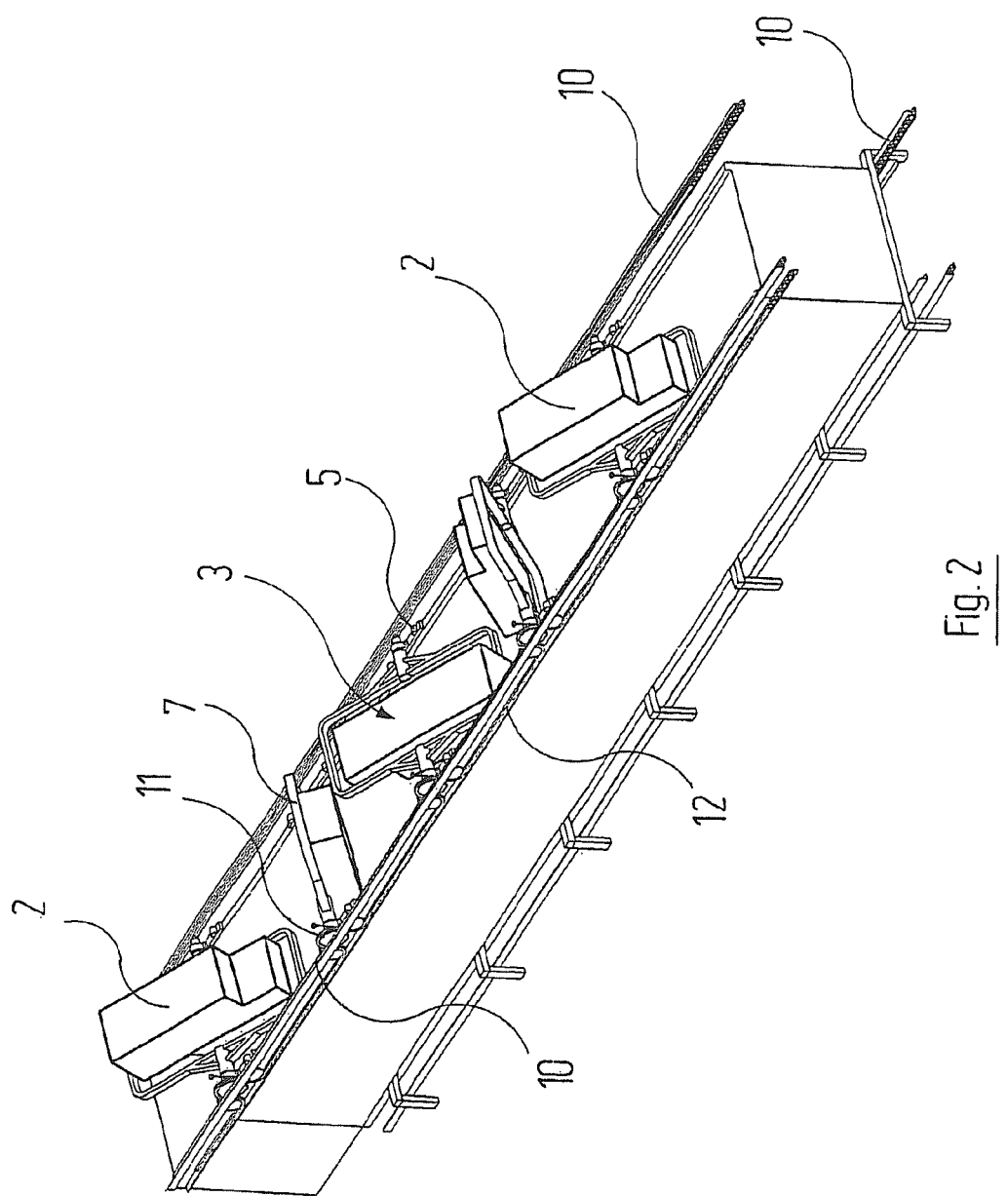
FIG. 2 shows a perspective view, similar to FIG. 1, however, with mounted vehicle bodies as articles to be painted.

Reference is firstly made to FIGS. 1 and 2. In these figures, a dip coating tank 1 can be recognised, which is part of a dip coating system. Such a dip coating system generally comprises a plurality of dip coating tanks 1 of this type which are passed through successively by the articles to be treated. In order to transport the articles to be treated 2, which may for example be vehicle bodies (see FIG. 2), a plurality of trolleys 3 is provided. Each of these trolleys 3 comprises, on opposing longitudinal sides of the dip coating tank 1, respectively one longitudinal crossbeam 4 (see in particular FIG. 4), in which two rollers 5 are rotatably mounted. The rollers 5 run on rails 6, which are arranged in the exemplary embodiment depicted on the lateral longitudinal walls of the dip coating tank 1. The depiction of the rollers 5 and the rails 6 is schematic; in practice, the rollers 5 are guided on the rails 6 by suitable means known to the person skilled in the art.

Each trolley 3 comprises a fastening device, in the depicted case a rotating frame 7, which is rotatably mounted in bearing blocks 9 on both longitudinal crossbeams with the aid of two rotating shaft ends 8 arranged on opposing sides. The articles 2 to be treated can be rigidly fastened on the rotating frame 7 in a known manner or movably with respect to said rotating frame in a defined manner.

Figure 3:
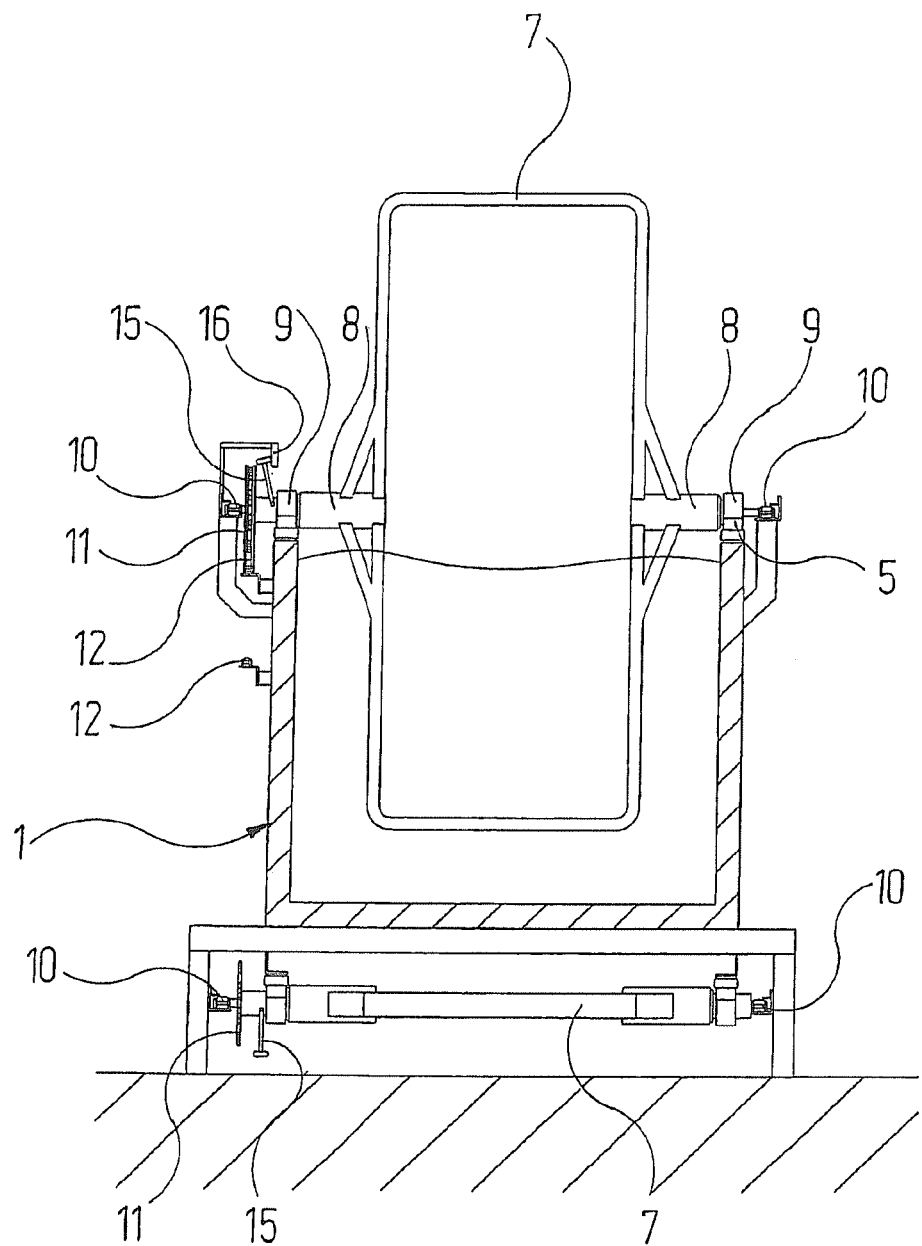
FIG. 3 shows a vehicle section through the dip coating system of FIG. 1.

The outer end regions of the rotating shaft ends 8 respectively engage into a traction chain 10. Accordingly, a traction chain 10 of this type extends on both opposing sides of the dip coating tank 1, parallel to the longitudinal extension thereof. The two traction chains 10 run over the entire system length or at least over a plurality of dip coating tanks 1 and are displaced with the aid of an electromotor not depicted in the drawing and a sprocket driven by the same. The return strand of the traction chains 10 runs below the dip coating tank 1 in a separate feedback region, as can be inferred from FIG. 3. In this feedback region, the empty trolleys 3 are also displaced back into their starting position.

The movements of the two traction chains 10 are of course synchronised, as is already known to the person skilled in the art and from DE 196 41 048 C2 mentioned in the introduction.

The articles 2 to be treated, fastened to the rotating frame 7 are rotated at suitable points of their movement paths (translation movement) together with the rotating frames 7 around the axes of the rotation shaft ends 8 and, in this regard, dipped into a treatment fluid, for example a paint which is filled into the dip coating tank 1 up to a certain level. During the course of this rotation, the articles 2 to be treated are preferably dipped fully into the treatment fluid and in the case of a further movement lifted out of the treatment fluid again, while a translation movement simultaneously takes place with the aid of the traction chains 10. All of this is also described in principle in DE 196 41 048 C2 to which reference is also made.

It is interesting in the present context how, in the present case, deviating from DE 196 41 048 C2, the rotation of the different rotating frames 7 is caused together with the articles 2 to be treated. To this end, a sprocket 11 is superimposed in a rotation-locking manner on the outer end region of one of the two rotation shaft ends 8, in FIG. 4 from the rotation shaft end 8 facing the observer. This sprocket 11 cams with a further chain 12, which should be referred to as a "rotation chain" for reasons that will become clear further below. This rotation chain 12 runs below the adjacent traction chain 10, somewhat inwards offset laterally to the latter. The rotation chain 12 extends in the exemplary embodiment depicted in FIG. 4 similar to the traction chain 10 over the entire system length or at least over a plurality of path sections in which a rotation of the rotating frame 7 should take place. The return strand of the rotation chain 12 is, in this exemplary embodiment, guided to the adjacent side wall of the dip coating tank 1, as can be inferred from FIG. 3.

In order to clasp the sprocket 11 better, two rounded chain guide bodies 13 are provided on both sides of said sprocket on the trolley 7 such that the rotation chain 12 encloses the sprocket 11 in a so-called omega guide. The chain guide bodies 13 can also be designed as freely rotating sprockets.

The above-described arrangement of traction chains 10 and rotation chain 12 then obviously leads to a rotation of the rotating frame 7 when traction chains 10 and rotation chain 12 are operated at different speed. The rotation speed of the rotating frame 7 thus depends on the difference of the speeds of traction chain 10 and rotation chain 12, wherein the rotation direction can also be reversed.

In order that the rotating frame 7 does not rotate on the entire movement path of the trolley 3 over the dip coating tank 1 and between the latter, a coupling 14 is built into the rotation shaft end 8 bearing the sprocket 11. This coupling 14 can be mechanically operated with the aid of a coupling rod 15. Depending on the position of the coupling rod 15, three types of operation are possible in this regard: in a first type of operation, the coupling 15 runs empty. There is thus no rotation transferred from the rotating sprocket 11 to the rotating frame 7. In a second position of the coupling rod 5, the rotation of the sprocket 11 is transferred, in a first rotation direction, to the rotating frame 7, and in a third position of the coupling rod 15, the rotation of the sprocket 11 is transferred in an opposing rotation direction to the rotating frame 7.

The actuation of the coupling 14 via the coupling rod 15 occurs with the aid of guide mechanisms 16 which are arranged there in a stationary manner in the movement path of the coupling rods 15 where a rotation should take place.

Figure 4:
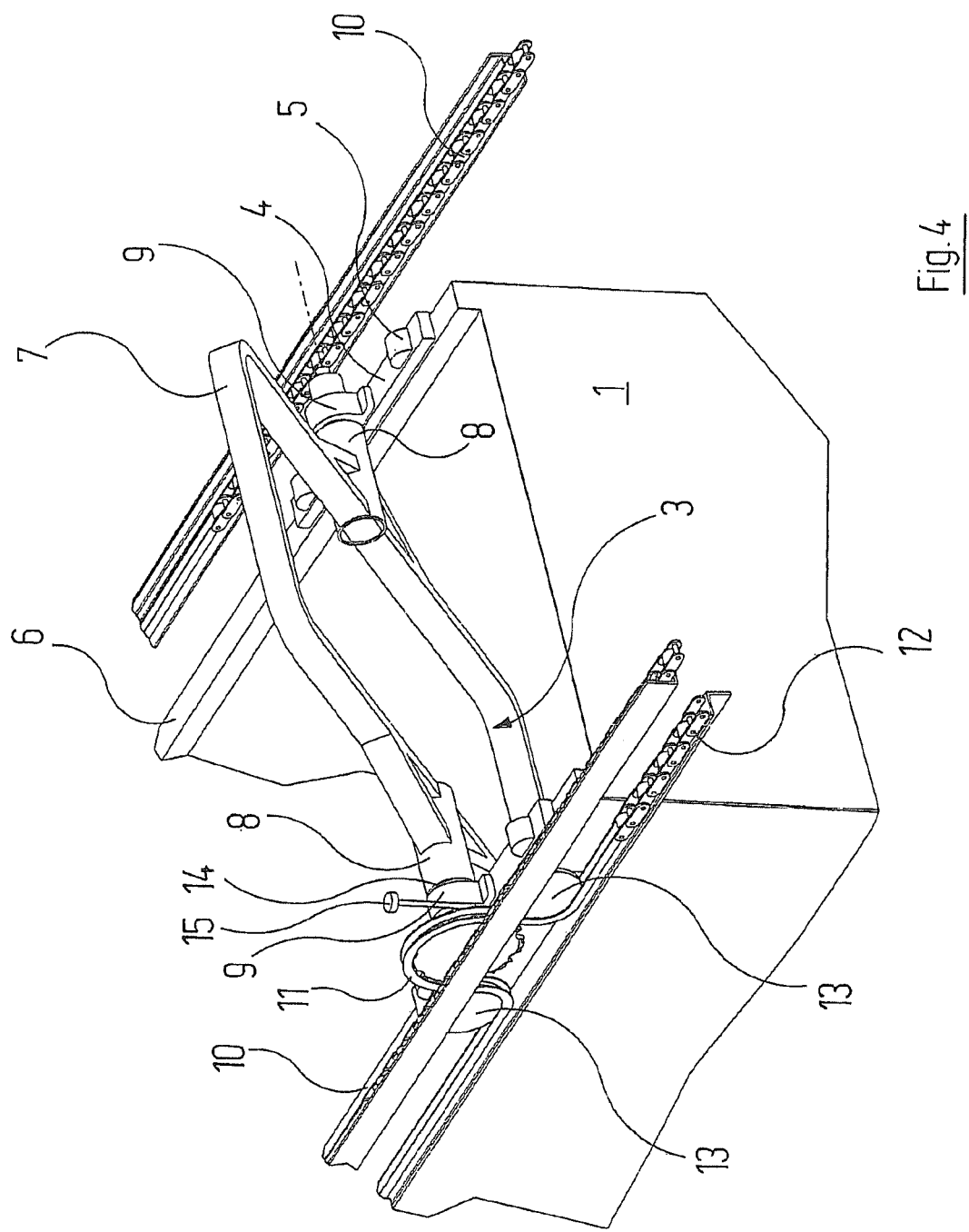
FIG. 4 shows a detail enlargement from FIG. 1.

The manner of functioning of the exemplary embodiment of a dip coating system depicted in FIG. 4 is thus as follows:

The trolleys 3 loaded with articles 2 to be treated, as shown in FIG. 2, are guided with the aid of traction chains 10 for example from top left coming over the dip coating tank 1. In this regard, the coupling 14 is initially disengaged such that no rotation of the rotating frames 7 and the articles 2 to be treated takes place. The conveying of the articles 2 to be treated can, in this regard, in particular take place in a horizontal orientation. If the trolley 3 has reached a position over the dip coating tank 1 in which a rotation of the rotating frame 3 is desired, the coupling rod 15 runs on a guide mechanism 16 arranged in a stationary manner at this point. The coupling rod 15 is displaced and the coupling 14 engages here such that a rotation of the rotating frame 7 is initiated with the article 2 to be treated fastened thereto.

The rotation is continued until the article 2 to be treated is dipped into the treatment fluid in the course of the further movement of the trolley 3, wherein it is generally "upside down". The coupling can now disengage again as desired such that the articles 2 to be treated are pulled away over a certain stretch in this position through the treatment fluid. Then, but also optionally directly following the movement of rotating in, the coupling 14 is subsequently re-engaged by a corresponding guide mechanism 16 and the rotation movement continued until the article 2 to be treated is again completely removed from the treatment fluid.

In the depiction of FIG. 2, the same rotation direction is selected for rotating in and rotating out. Essentially, however, it is readily conceivable to change the rotation direction for dipping and removing.

Figure 5:
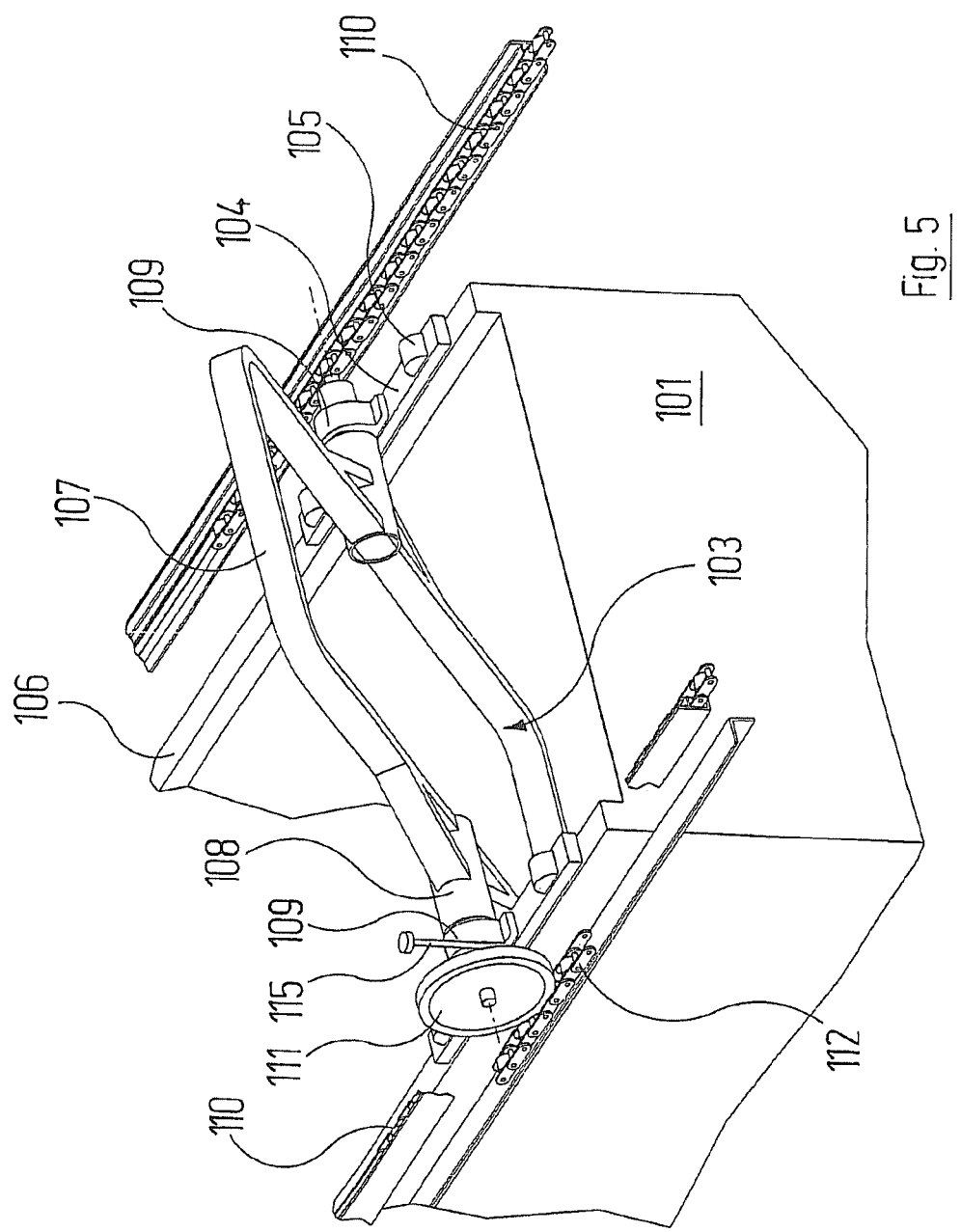
FIG. 5 shows a view, similar to FIG. 4, of a second exemplary embodiment of a dip coating system.

The exemplary embodiment depicted in FIG. 5 of a dip coating system is very similar to the one that was described above by means of FIG. 4. Corresponding parts are thus labelled with the same reference numerals with the addition of one hundred. The only difference between these two exemplary embodiments is that in the case of the exemplary embodiment of FIG. 5, an omega-shaped clasping of the sprocket 111 is dispensed with. The sprocket 111 thus engages only with its lower circumferential region into the rotation chain 112 guided in a straight line.

Figure 6:
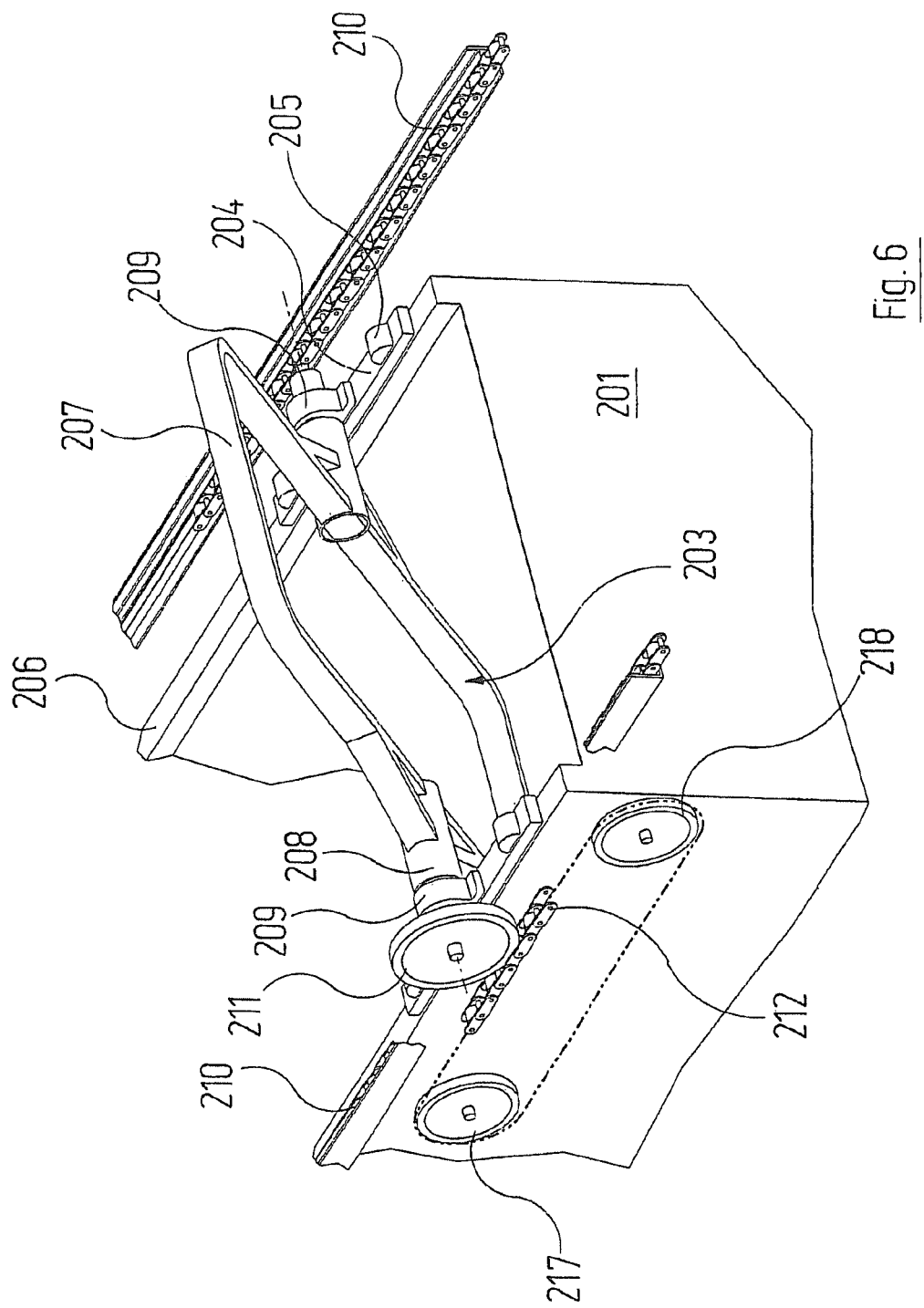
FIG. 6 shows a view, similar to FIGS. 4 and 5, of a third exemplary embodiment of a dip coating system.

The third exemplary embodiment of the invention depicted in FIG. 6 also corresponds in its basic function with the previously described exemplary embodiments. The corresponding parts are thus again labelled with the same reference numerals, once again increased by one hundred. The exemplary embodiment of FIG. 6 is more similar in this respect to that of FIG. 5, as there is no omega-shaped clasping of the sprocket 211 provided here. The difference here is that the rotation chain 212 does not extend over the entire length of the dip coating tank 201, but rather only over the section in the movement direction of the trolleys 203 in which a rotation of the rotating frame 203 is desired. The rotation chain 212 is, to this end, guided via two deflection wheels 217 in the schematically depicted manner and driven in a suitable manner.

In the case of the exemplary embodiment of FIG. 6, a coupling in the rotation shaft end 208 bearing the sprocket 211 is dispensed with. The sections during the course of the translation movement of the trolleys 203, in which a rotation of the rotating frame 207 and of the article 2 to be treated fastened thereto should be caused, is exclusively determined by the position of the proportionally short rotation chains 212: as soon as the sprocket 211 runs on the rotation chain 212 during the course of the translation movement of the trolley 203, the rotation movement begins. If the sprocket 211 leaves the rotation chain 212, the rotation movement stops. The same essentially applies for the speed of the rotation movement and the rotation direction, as was described above for the exemplary embodiment of FIG. 4.

It is essentially conceivable to also use a stationary rotation chain or a stationary rotation gear rack instead of a movable rotation chain. In the case of this simple embodiment however, setting the rotation speed of the rotating frame and rotation direction is not possible in the simple manner depicted above.

The guide mechanism 16 and/or the coupling rod 15 can be designed such that the interaction thereof can optionally be activated or deactivated. This can, for example be achieved such that the guide mechanism and/or coupling rod are removed from a position, in which they can be reached by the respectively other part, from the movement path of the respectively other part. Thus certain baths can be passed over without rotation, as required, or a rotation of the rotating frame 7 can be prevented for certain, for example empty trolleys.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

I claim:

1. A dip coating system comprising:
   a) at least one dip coating tank which can be filled with a treatment fluid into which the articles to be coated can be dipped;
   b) a conveyor system, which can displace the articles to be treated to the at least one dip coating tank, into the interior of the at least one dip coating tank, out of the at least one dip coating tank and away therefrom and comprises:
      ba) at least one trolley which has a fastening device which can be rotated around an axis of rotation, to which at least one article can be fastened;
      bb) a rotating device with which the fastening device can be rotated in certain sections of the movement path of the at least one trolley;
      bc) at least one driven traction chain extending parallel to the movement path of the at least one trolley;
   wherein
   c) the rotating device comprises
      ca) at least one sprocket or gear wheel that can be connected to the fastening device in a rotation-locking manner which is arranged coaxial to the axis of rotation of the fastening device;

cb) at least one rotation chain or rotation gear rack which extends parallel to the movement direction of the at least one trolley with which the sprocket or gear wheel cams, and further wherein the at least one rotation chain or the rotation gear rack extends in the movement direction of the at least one trolley over a section, in which a rotation movement should take place and in that an adjustable coupling is provided, which in a first rotation direction does not establish a rotation connection between the at least one sprocket or gear wheel and fastening device in a first position and establishes a rotation connection between the at least one sprocket or gear wheel and fastening device in a second position and the adjustable coupling has a third position, in which a rotation connection is established between the at least one sprocket or gear wheel and the fastening device in a second rotation direction opposed to the first rotation direction.

2. The dip coating system according to claim 1, wherein the adjustable coupling is actuatable via a coupling rod which cooperates with at least one guide mechanism, which is arranged in a stationary manner at a section of the movement path of the at least one trolley, in which a rotation should take place.

3. The dip coating system according to claim 2, wherein the at least one guide mechanism can be displaced from a position, in which it cooperates with the coupling rod, into a position, in which the at least one guide mechanism does not cooperate with the coupling rod.

4. The dip coating system according to claim 2, wherein the coupling rod can be displaced from a position, in which it cooperates with the at least one guide mechanism, into a position, in which the coupling rod does not cooperate with the at least one guide mechanism.

5. The dip coating system according to claim 1, wherein the at least one rotation chain or the rotation gear rack is provided only in such sections of the movement path of the at least one trolley, at which a rotation should take place.

6. The dip coating system according to claim 1, wherein the at least one rotation chain is displaceable in the longitudinal direction.

7. The dip coating system according to claim 1, wherein the at least one rotation chain or rotation gear rack is not displaceable in the longitudinal direction.

* * * * *